United States Patent [19]

Wolcott

[11] Patent Number: 4,780,637

[45] Date of Patent: Oct. 25, 1988

[54] BRUSHLESS EDDY CURRENT COUPLING - STATIONARY FIELD

[75] Inventor: John H. Wolcott, Bristol, Wis.

[73] Assignee: Eaton Corporation, Cleveland, Ohio

[21] Appl. No.: 65,118

[22] Filed: Jun. 22, 1987

Related U.S. Application Data

[63] Continuation of Ser. No. 811,186, Dec. 20, 1985, abandoned.

[51] Int. Cl.$^4$ .......................................... H02K 49/04
[52] U.S. Cl. ...................................... 310/263; 310/92; 310/105
[58] Field of Search ..................... 310/53, 63, 105, 261, 310/263

[56] References Cited

U.S. PATENT DOCUMENTS

| | | | |
|---|---|---|---|
| 3,217,197 | 11/1965 | Sturzenegger | 310/263 |
| 3,996,485 | 12/1976 | Jaeschke | 310/105 X |
| 4,379,242 | 4/1983 | MacDonald | 310/105 |
| 4,385,695 | 5/1983 | MacDonald et al. | 310/105 |
| 4,410,819 | 10/1983 | Kobayashi et al. | 310/105 |
| 4,469,968 | 9/1984 | Jaeschke | 310/62 |

Primary Examiner—Patrick R. Salce
Assistant Examiner—D. L. Rebsch
Attorney, Agent, or Firm—M. L. Union

[57] ABSTRACT

An eddy current coupling for a dynamo-electric machine. A flux path between a rotating drive shaft and a rotatable driven shaft includes an inductor drum connected to the drive shaft and a pole assembly coupled to the driven shaft. A coil assembly partially surrounded by the pole assembly controls the degree of electromagnetic coupling. A series of interdigitated pole fingers are spaced between the inductor drum and the field coil assembly to facilitate air flow that dissipates heat caused by relative rotation between the inductor drum and the pole assembly. The coil assembly includes an annular coil support co-axial with the driven shaft to support an annular field coil in a gap defined by the pole assembly.

9 Claims, 3 Drawing Sheets

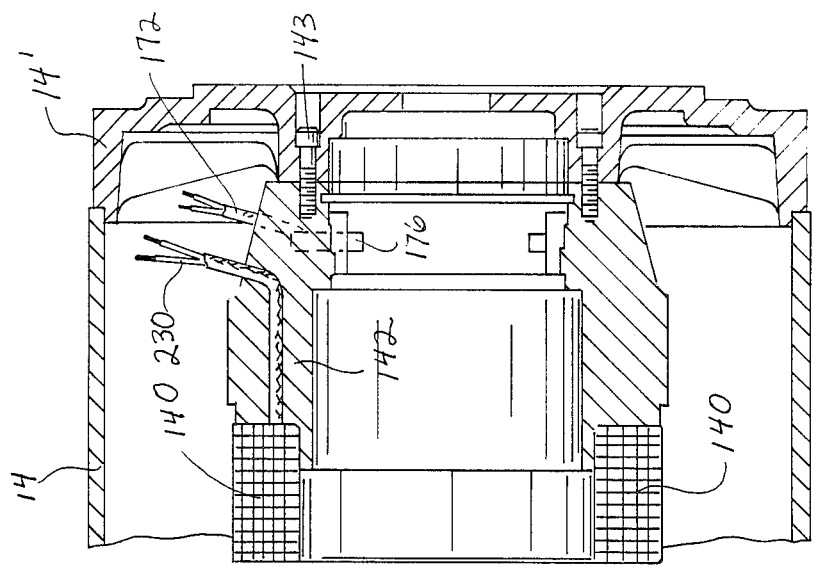
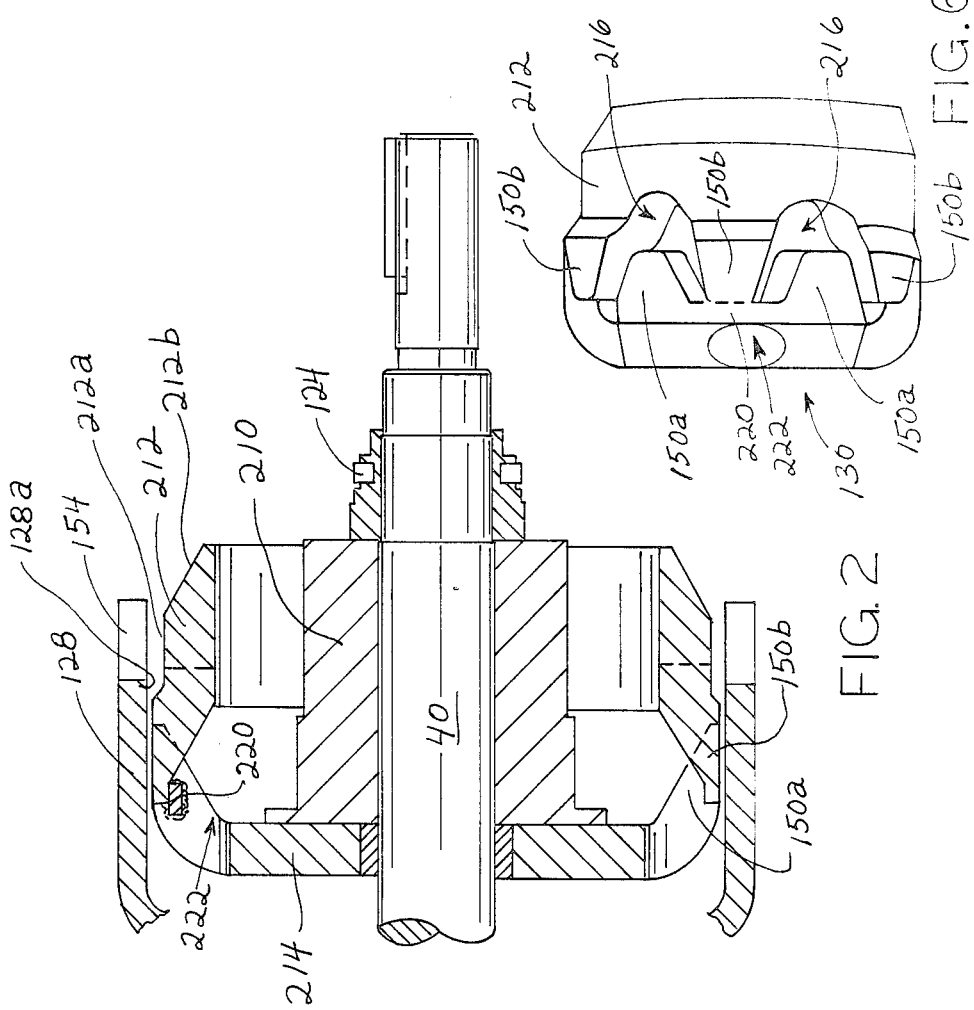
FIG. 3
FIG. 6
FIG. 2

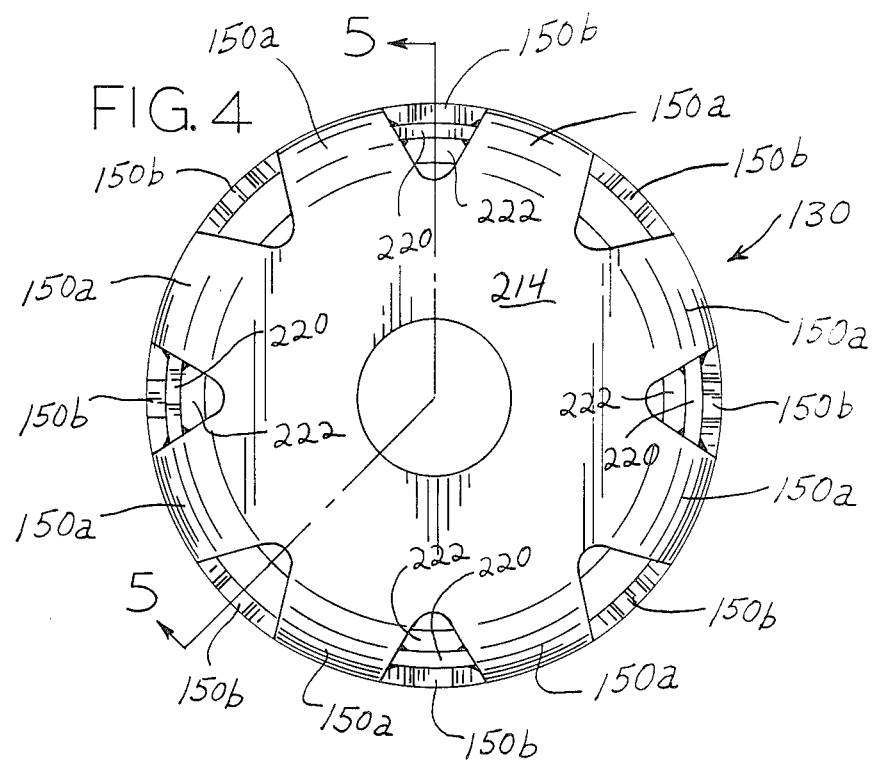
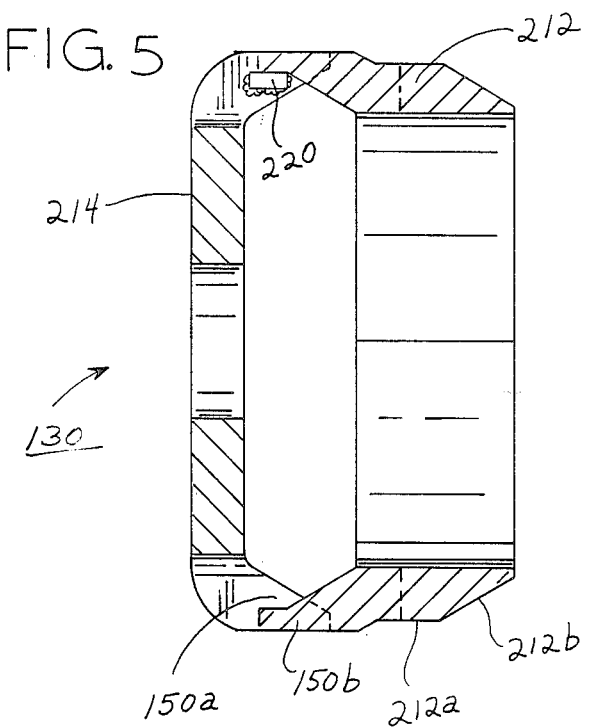

BRUSHLESS EDDY CURRENT COUPLING - STATIONARY FIELD

This application is a continuation, of application Ser. No. 6/811,186, filed 12-20-85 now abandoned.

DESCRIPTION

1. Technical Field

The present invention relates to an eddy current coupling of a dynamoelectric machine.

2. Background Art

Eddy current couplings for use with dynamoelectric machines are known in the art. The eddy current couplings of these machines include an inductor and a pole member that are electromagnetically coupled by a field generating coil. Generally, a slip ring assembly is utilized to provide electrical energy to a rotating field coil. The electrical energy is supplied to the slip ring assembly through stationary brushes. It is necessary to enclose the slip rings and brushes of these prior art couplings to prevent chemical or electrolytic corrosion.

U.S. Pat. Nos. 4,469,968 to Jaeschke and 4,476,410 to Wolcott disclose prior art dynamoelectric machines that incorporate brushes and slip rings to energize a rotating field coil. These two patents are expressly incorporated herein by reference.

In some applications, even though precautions are taken to isolate the coupling, environmental contamination causes accelerated brush wear that requires costly service and "down" time of the machine. There are applications where the eddy current coupling has limited accessibility and therefore even normal brush wear cannot be tolerated. In these situations the prior art slip-ring/brush contacts must be replaced by stationary coil couplings. Unfortunately prior art stationary coil eddy current couplings known to applicant exhibit some undesirable features. They employ structure that blocks air flow in the vicinity of the coil that results in ineffective cooling of the eddy current coupling. The structure of these couplings is complex and thus costly to manufacture.

DISCLOSURE OF THE INVENTION

The eddy current coupling of the present invention includes rotatably mounted flux coupling members that create a radial space into which a stationary field coil assembly fits. Since the field coil does not rotate no slip ring and brushes are needed. A flux path is created that jumps ccross air gaps between rotating and stationary flux carrying members.

An eddy current coupling constructed in accordance with the invention includes an input member and an output member rotatable relative to each other about an axis of rotation. A pole assembly coupled to one of the input and output members and an inductor member coupled to the other of the input and output members electromagneticly engage each other under the control of a field coil.

A stationary field coil is mounted to an annular coil support. The coil is surrounded by a rotating pole piece having inner and outer axially extending pole portions connected by an end portion. In wrapping around the coil these portions form a flux carrying path when the field coil is energized. The outer axial portion of the pole assembly defines interdigitated fingers spaced to allow air to flow to the region of the coupling to dissipate heat.

As the current through the field coil is varied, the extent of coupling between the pole assembly and inductor member varies so that the relative rotation between the input and output members is controlled. The effectiveness of this coupling is to an extent controlled by the separation between the flux carrying members. For this reason, the spacing between pole assembly, inductor member, and coil support is small. The air gaps between the coil support, pole assembly, and inductor allow sufficient air flow to avoid overheating. In a preferred embodiment of the invention the inductor assembly includes fins that also help generate air flow in the vicinity of the coupling, thereby dissipating heat.

In a preferred embodiment of the invention, the input and output members comprise input and output shafts rotatably mounted within a coupling housing. The coil support is an annular member extending from one end of the housing into a region defined by the eddy current pole assembly. The pole assembly wraps around the field coil and associated coil support to produce an effective coupling path for electro-magnetic energy generated via the field coil. This construction results in better heat dissipation during operation. This eddy current coupling can be manufactured at a cost that is less than the cost of prior art eddy current couplings.

From the above, it is appreciated that one object of the invention is an improved eddy current coupling having improved heat dissipating characteristics and effective electromagnetic coupling yet which is easier to manufacture than prior art eddy current couplings. These and other objects, advantages and features of the invention will become better understood when a detailed description of a preferred embodiment of the invention is described in conjunction with the accompanying drawings.

BRIEF DESCRIPTION OF THE DRAWINGS

FIG. 2 is a sectioned view of a rotatable pole assembly utilized in a preferred embodiment of the invention;

FIG. 3 is a sectioned view of a stationary coil support mounted in relation to the rotatable pole assembly of FIG. 2;

FIG. 4 is an end elevation view of the pole assembly;

FIG. 5 is a view taken along the line 5—5 in FIG. 4; and

FIG. 6 is a side elevation view of the eddy current coupling pole assembly.

BEST MODE FOR CARRYING OUT THE INVENTION

Figure 1:
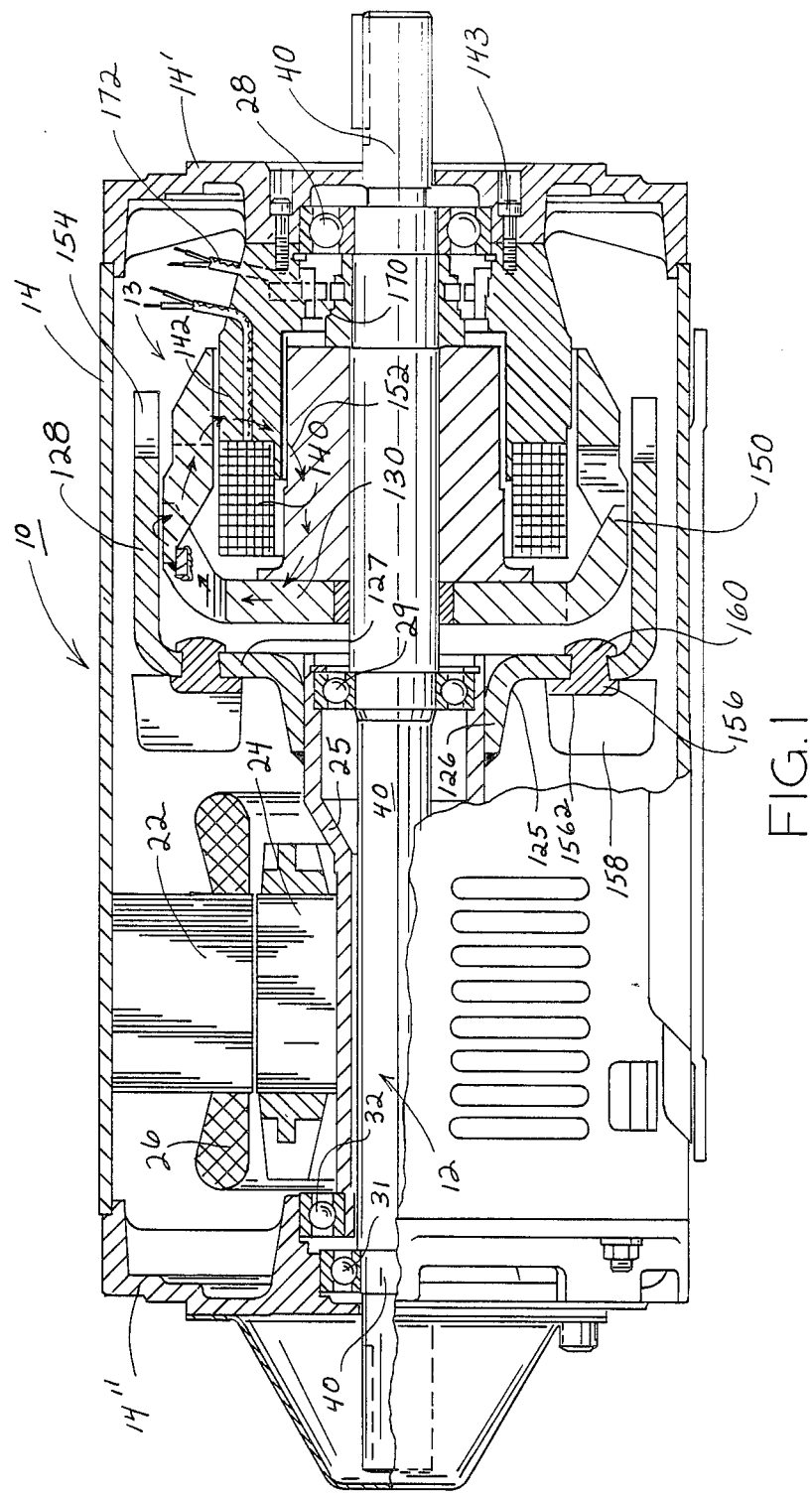
FIG. 1 is a partially sectioned view showing a eddy current coupling constructed in accordance with the invention.

Turning now to the drawings, FIG. 1 discloses an electro-magnetic coupling 10 of the present invention including a motor driven, variable-speed output power mechanism having a motor section 12 and an axially adjacent coupling section 13 contained in a single housing 14. The motor section 12 contains an electric motor which is of a conventional type comprising a stator 22 connected to the housing 14, and rotor 24 secured to a hollow shaft member 25. Both the stator 22 and rotor 24 are of a laminated construction, and the stator 22 is provided with field windings 26.

The housing 14 is provided with several suitable bearing members. These bearing members include an anitfriction bearing 28 located in a cover 14', an intermediate pilot bearing 29 and bearing members 31 and 32 provided on an opposite cover 14″ of the housing 14 which support the shaft 25 and a coaxial shaft 40 for rotation therein. The shaft 25 is exemplary, and other co-axial shaft assemblies may be used as drive shafts.

When the shaft 25 is driven by the rotor 24 it is considered a power input shaft to the coupling section 13 and the shaft 40 is considered a power output shaft which is adapted to be connected to a driven load (not shown). The shaft 40 is keyed at both ends to allow power take-off from either end of the coupling 10.

Connected to the drive shaft 25 is an inductor assembly or inductor drum 125 including a hub portion 126, a radially extending portion 127 and a cylindrical inductor drum portion 128 which is composed of a ferromagnetic material such as steel and which may have a substantially uniform magnetic reluctance.

Connected to the driven shaft 40 for rotation therewith is a magnetic field pole assembly or rotor assembly 130. The pilot bearing 29 is supported on the driven shaft 40 and supports the drive shaft 25 for rotation relative to the pole assembly 130. The pilot bearing 29 locates the inductor drum assembly 125 in the central portion of the housing 14 relative to the pole assembly 130 which is supported by the driven shaft for rotation therewith. The pilot bearing 29 maintains a radial air gap or clearance between the inductor assembly 125 and the pole assembly 130 to provide for relative rotation therebetween.

The field pole assembly 130 surrounds a circular field coil 140 supported on a magnetic ring that serves as a coil support 142. The support 142 is connected to the housing cover 14′ with threaded connectors 143. The pole assembly 130 carries 16 pole teeth or pole pieces 150 which are interdigitated in a manner to be described below.

The pole teeth 150 are disposed adjacent an innersurface 128a of the cylindrical portion 128 of the inductor drum assembly 125. A narrow air gap or space is provided between the poles 150 and this drum innersurface 128a to allow for relative rotation between the inductor drum assembly 125 and the pole assembly 130.

Energization of the field coil 140 establishes a flux path, represented by the arrows 152 in FIG. 1, which electro-magnetically couples the field pole assembly 30 and the inductor drum assembly 125 so that rotation of the inductor drum assembly 125 by the driven input shaft 25 effects rotation of the pole assembly 130 and output shaft 40 connected thereto. The magnitude of the energization of field coil 140 controls the slip between the pole assembly 129 and the inductor drum assembly 125 in a known manner.

During the operation of the electro-magnetic coupling device 10, relative rotation between the pole assembly 130 and inductor drum assembly 125 results in the generation of eddy currents in the cylindrical portion 128 of the inductor drum. These eddy currents produce a magnetic field which permits the transmission of torque from the inductor drum assembly 125 to the pole assembly 130 as discussed above. Normally, a certain amount of "slip" occurs during the rotation of the inductor drum assembly 125 and the pole assembly 130 and such "slip", or difference in rotational speed gen (Nrates heat in the inductor drum assembly 125.

The cylindrical portion 128 of the inductor drum assembly 125 includes a plurality of axially extending teeth 154 disposed on the end portion thereof. These teeth 154 and the notches in between act to dissipate heat generated in the cylindrical portion 128 of the inductor drum assembly 125.

The inductor drum assembly 125 includes a heat dissipating member 156 disposed on the drum's radially extending portion 127. The heat dissipating member 156 comprises an annular ring having a heat dissipating surface 156a thereon which includes a plurality of fins 158 extending therefrom in a direction substantially parallel to the axis of rotation of the drum assembly 125 and a plurality of fastening means or rivets 160 which also extend parallel to the axis of rotation but in a direction opposite to that in which the fins 158 extend. The heat dissipating member 156 is operable to rotate with the inductor drum assembly 125 and dissipate heat generated in the inductor drum assembly 125 by the eddy current action. The rivet members 160 are integrally formed with the heat dissipating member 156 and each rivet 160 is operable to be received in one of a plurality of openings disposed in the radially extending portion 127 of the inductor drum 125. After the rivets 160 are located in these openings the heads of the rivets are deformed to secure the heat dissipating member 156 to the inductor drum assembly 125.

A tachometer generator assembly 170 may be located in the housing. The tachometer generator 170 is operable to establish a signal on an output line 172 indicative of the speed of the output shaft 40. This signal may be utilized by electrical circuitry, not illustrated, to control the speed of the output shaft 40, in a well-known manner. The tachometer generator 170 includes a plurality of permanent magnetic poles 174 (FIG. 2) which are supported for rotation with the output shaft 40. A stator assembly 176 is supported by the coil support 142 adjacent the permanent magnetic poles 174 of the tachometer generator 170 and is operable to have a current induced therein, which is proportional to the speed of the output shaft 40.

As seen most clearly in FIGS. 2 and 4–6, the pole assembly 130 includes two axially extending, generally annular portions 210, 212 connected by a radially extending end piece 214 that defines eight spaced pole pieces or teeth 150a at a radially outward position. The outermost annular portion 212 defines eight additional poles or teeth 150b evenly spaced about the outer annular pole assembly and interdigitated with the teeth 150a to form air flow gaps 216 (FIG. 6).

Alternate teeth 150b bridge the gaps 216 and are connected (by welding) to the end piece 214 by anchor members 220 that bridge between the teeth 150a. The anchor members do not completely block the spacing between these teeth 150a so that at the four circumferentially spaced anchor positions openings 222 allow air to circulate in the vicinity of the pole assembly 130. The gaps 216 between the two sets of fingers 150a, 150b also promote air circulation.

As seen most clearly in FIG. 1, the gap between an outer surface of the fingers 150a, 150b and the inner inductor drum surface is minimized, to optimize eddy current coupling. Even with this minimal spacing the interdigitated finger arrangement fosters air flow in and around the coupling.

By referring to FIG. 2, it is seen that in the region of the inductor drum teeth 154 the outermost annular portion 212 of the pole assembly 130 defines surfaces 212a, 212b spaced a greater distance from the drum than the spacing between the drum and pole assembly 130 in the vicinity of the pole pieces 150a, 150b. This larger spacing allows air to circulate away from the pole assembly 130 as relative rotation between the drum 125 and pole assembly 130 occurs.

The coil support 142 is also annular and, with the coil 140 mounted at one end, fits within and is partially surrounded by the pole assembly 130. A passageway in the coil support provides a path for field coil energization conductors (FIG. 3) 230 to be routed to the coil. The coil support 142 is constructed of ferromagnetic material, preferably steel, and as seen most clearly in FIG. 1 the flux path 152 traverses the support 142. The annular shape of the coil support 142 makes it relatively easy to manufacture and results in a less costly and lighter weight structure than prior art coil supports known to applicant. The spacing between the coil support 142 and the inner and outer annular pole assembly members 210, 212 must also be minimized to achieve effective electromagnetic coupling across the air gaps.

The present invention has been described with a degree of particularity. It is the intent, however, that the invention include all modifications and alterations from the disclosed design falling within the spirit or scope of the appended claims.

I claim:

1. An eddy current coupling comprising a housing, a rotor member disposed within the housing and mounted to a rotatable output shaft, an inductor drum disposed within the housing and coupled to a driven input shaft, said inductor drum including a radial portion and a cylindrical portion supported by said radial portion and disposed to rotate about an axis or rotation of said output shaft, coil means disposed in prosimity to the drum and rotor to electromagnetically couple the drum and rotor, said coil means fixed with respect to said housing and including an eddy current inducing coil at one end of a fixed annular coil support co-axial with said output shaft's axis of rotation, said rotor member having a first annular member coupled to the output shaft and spaced radially inward from the coil support, an endpiece laterally spaced from the coil, a plurality of interdigitated pole pieces spaced radially outside the coil and radially inwardly relative to said cylindrical portion of said inductor drum, and a second annular member spaced radially outwardly from the coil support, said pluraliy of said interdigitated pole pieces including first and second annular sets of pole pieces, said first annular set of pole pieces being connected to said endpiece and said second annular set of pole pieces being connected at one end to said pole of said first annular set of pole pieces and being connected at the opposite end to said second annular member, said second annular member being spaced apart from said cylindrical portion of said inductor drum a distance greater than the distance between said cylindrical portion of said inductor drum and said plurality of interdigitated pole pieces to define an air gap between the cylindrical portion of said inductor drum and said interdigitated pole pieces and second annular member which has a sufficient cross-sectional area to provide for the axial flow of cooling fluid between said first and second annular sets of pole pieces and between said cylindrical portion of said inductor drum and said pole pieces to dissipate heat in the vicinity of the rotor and for directing the flow of cooling fluid to said coil means to effect cooling thereof, said pole pieces further defining outer surfaces facing an inner surface of said cylindrical portion of said inductor drum to complete a flux path that surrounds said coil and includes said inductor drum, rotor pole pieces, rotor endpiece, annular member, and coil support.

2. The eddy current coupling of claim 1 wherein the inductor drum has air circulating fins mounted at one end extending into a cavity defined by the housing to create an air movement in the vicinity of the rotor.

3. The eddy current coupling of claim 1 wherein the endpiece of said rotor member is a generally disk-shaped member having a diameter which is less than or equal to the diameter of the coil means, said endpiece of said rotor member supporting said plurality of interdigitated pole pieces around the coil means at a radius greater than the outer radius of the coil means.

4. An eddy current coupling comprising an input member, an output member rotatable relative to said input member about an axis of rotation, a pole assembly coupled to said output member, an inductor member coupled to said input member, said inductor member including a radially extending portion and a cylindrical portion disposed to rotate about said axis of rotation, a field coil assembly associated with said pole assembly for electromagnetically couling said input and output members, said coil assembly including a coil and coil support, said pole assembly having a radially extending endpiece, a plurality of pole pieces supported by said endpiece and inner and outer axially extending members coupled to said endpiece which in combination wrap around said coil assembly to create a flux carrying path around said coil assembly which is adapted to couple said pole assembly and inductor member upon energization of said coil, said outer axial member being spaced apart from said cylindrical portion of said inductor drum a distance greater than the distance between said cylindrical portion of said inductor drum and said plurality of pole pieces to define an air gap between the cylindrical portion of said inductor member, said pole pieces and said outer axial member which provides for the axial flow of cooling fluid over said outer axial member, between said plurality of pole pieces and between said cylindrical portion of said inductor member and said assembly and to further define an air gap between an inner surface of said annular portion and said coil support to allow relative rotation between the inductor, pole assembly and coil assembly.

5. An eddy current coupling comprising an input member, an output member rotatable relative to said input member about an axis of rotation, a pole assembly coupled to said input member, an inductor member coupled to said output member, said inductor member including a radially extending portion and a cylindrical portion disposed to rotate about said axis of rotation, a field coil assembly associated with said pole assembly for electromagnetically coupling said input and output members, said coil assembly including a coil and coil support, said pole assembly having a radially extending endpiece, a plurality of pole pieces supported by said endpiece and inner and outer axially extending members coupled to said endpiece which in combination wrap around said coil assembly to create a flux carrying path around said coil assembly which is adapted to couple said pole assembly and inductor member upon energization of said coil, said outer axial member being spaced apart from said cylindrical portion of said inductor drum a distance greater than the distance between said cylindrical portion of said inductor drum and said plurality of pole pieces to define an air gap between the cylindrical portion of said inductor member, said pole pieces and said outer axial member which provides for the axial flow of cooling fluid over said outer axial member, between said plurality of pole pieces and between said cylindrical portion of said inductor member and said pole assembly and to further define an air gap between an inner surface of said annular portion and said coil support to allow relative rotation between the inductor, pole assembly and coil assembly.

6. The coupling of claim 4 wherein the input and output members comprise rotatable input and output shafts mounted in a housing and said pole assembly is mounted to the output shaft for rotation within the housing.

7. The coupling of claim 6 where the coil support comprises a stationary annular member mounted inside the housing and defines a passageway for routing a conductor from outside the housing to said field coil.

8. The coupling of claim 7 where the annular coil support defines inner and outer surfaces that face the inner and outer axially extending portions of the pole assembly to define air passages leading to the field coil.

9. The coupling of claim 6 where the pole assembly inner axial member comprises an annular ferro-magnetic material coupled to said output shaft for rotation with said output shaft, said endpiece also comprises a ferro-magnetic material and supports said outer axial member through a series of interdigitated pole pieces, said pole pieces including two sets of equal number, a first set directly connected to said endpiece, a second set connected to said outer axial pole member and where alternate ones of said second set are connected to said first set by anchor members that bridge adjacent ones of said first set of pole pieces.

* * * * *